United States Patent [19]
Kato

[11] Patent Number: 6,000,298
[45] Date of Patent: Dec. 14, 1999

[54] FLUCTUATION TORQUE CANCELLATION APPARATUS

[75] Inventor: Heizaburo Kato, Shizuoka-ken, Japan

[73] Assignee: Sankyo Seisakusho Co., Tokyo, Japan

[21] Appl. No.: 08/840,863

[22] Filed: Apr. 17, 1997

[30] Foreign Application Priority Data

Apr. 19, 1996 [JP] Japan ................................. 8-098207

[51] Int. Cl.$^6$ .............................. F16H 53/06; F16H 53/00
[52] U.S. Cl. ................................ 74/569; 74/567; 100/282
[58] Field of Search ......................... 74/567, 569, 579 E;
100/35, 282, 292; 83/615

[56] References Cited

U.S. PATENT DOCUMENTS

| | | | |
|---|---|---|---|
| 1,738,876 | 12/1929 | Edwards et al. | 74/579 R |
| 1,753,020 | 4/1930 | Pielstick | 74/579 R |
| 2,423,701 | 7/1947 | Hardy | 74/569 |
| 2,543,649 | 2/1951 | Wales et al. | 74/569 |
| 4,232,566 | 11/1980 | Lemke et al. | 74/569 |
| 4,352,296 | 10/1982 | Wendler et al. | 74/569 |
| 4,658,608 | 4/1987 | Fox | 74/569 X |
| 4,854,236 | 8/1989 | Thunker et al. | 74/569 |
| 4,955,243 | 9/1990 | Kato et al. | |
| 5,544,537 | 8/1996 | Konzal | 74/569 |
| 5,544,576 | 8/1996 | Kato | |
| 5,676,024 | 10/1997 | Yoshida et al. | 74/569 |

FOREIGN PATENT DOCUMENTS

| | | |
|---|---|---|
| 0 254 897 | 2/1988 | European Pat. Off. . |
| 0 800 021 | 10/1997 | European Pat. Off. . |
| 4437958A1 | 4/1995 | Germany . |
| 60-4665 | 11/1985 | Japan . |

*Primary Examiner*—Vinh T. Luong
*Attorney, Agent, or Firm*—Harness, Dickey & Pierce, P.L.C.

[57] ABSTRACT

A fluctuation torque cancellation apparatus which positively cancels a torque fluctuation developing on an input shaft or an output shaft of a motion conversion apparatus for converting a continuous rotational motion of the input shaft into a predetermined-type rotational motion, such as intermittent rotational motions of the output shaft, and includes a torque compensation cam, fixedly mounted on a rotation shaft for rotation therewith and has a cam surface, formed on a peripheral surface which reciprocally moves a slider in a cylinder while rotating a cam follower and with a coil spring, mounted within the cylinder, being compressed and expanded, so that the magnitude of pressing force of the cam follower against the torque compensation cam is varied, thereby cancelling a fluctuation torque applied to the rotation shaft, thus effecting a torque compensation for the motion conversion apparatus and including a source of pressurized air supplied to an air chamber in the cylinder to selectively vary the pressing force, so that the compensation torque is exerted on the rotation shaft, using both the spring pressure and the air pressure.

21 Claims, 13 Drawing Sheets

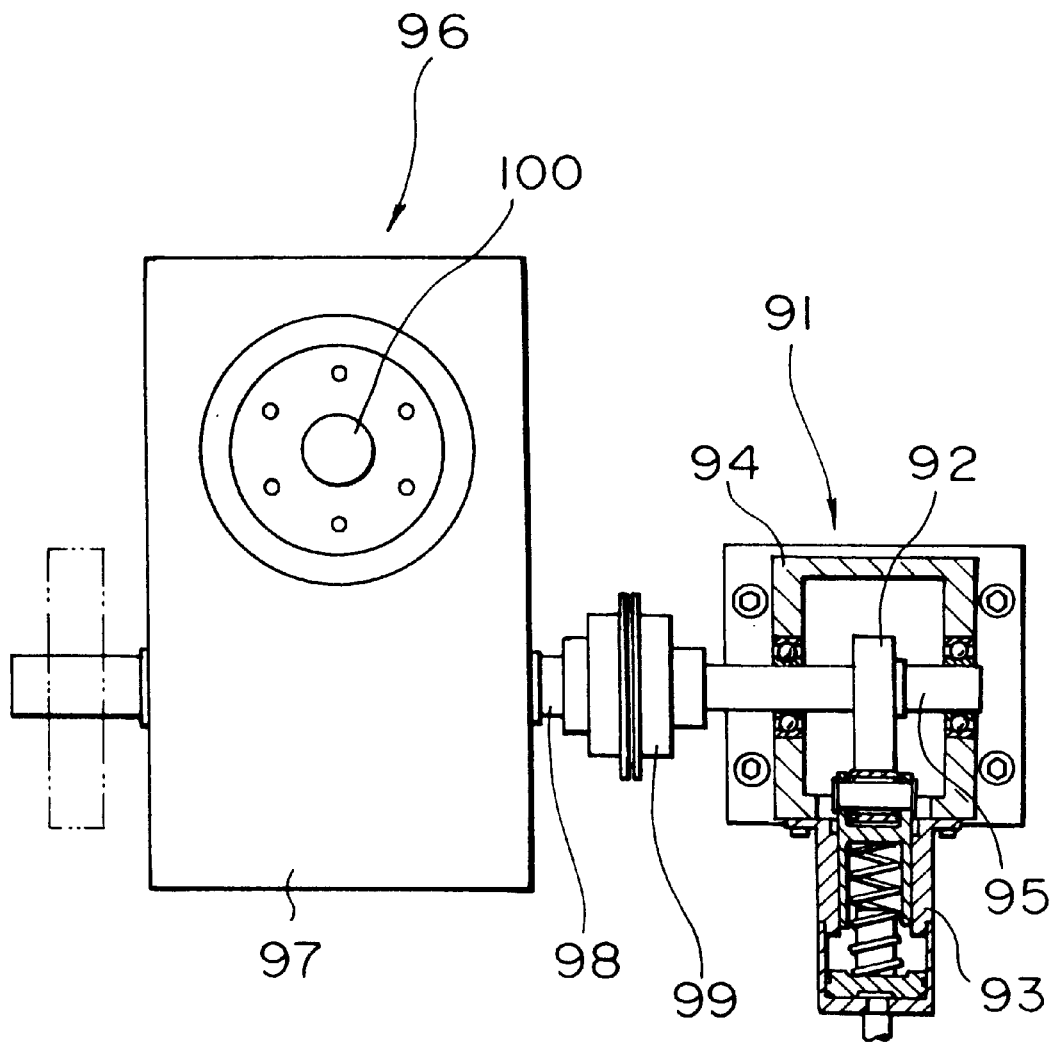

FLUCTUATION TORQUE CANCELLATION APPARATUS

BACKGROUND OF THE INVENTION

1. Field of the Invention

This invention relates to a fluctuation torque cancellation apparatus which can be connected to a rotation shaft (i.e., an input shaft or an output shaft) of a motion conversion apparatus for converting a continuous rotational motion of the input shaft into a special rotational motion of the output shaft, such as an intermittent rotational motion and a swinging rotational motion, or a predetermined-type motion of the output shaft such as a combination of such rotational motions, and also can be connected to an input shaft of a pressing machine incorporating a motion conversion apparatus for converting a continuous rotational motion of the input shaft into a reciprocal linear motion of a slide.

2. Related Art

In a motion conversion apparatus for converting a continuous rotational motion of an input shaft into a predetermined-type rotational motion of an output shaft through a cam mechanism such as an intermittent indexing device, a torque, acting on the output shaft during the operation, varies continuously, and a reaction force of this torque acts as a fluctuation torque on the input shaft. This torque, acting on the input shaft, prevents a uniform rotation of the input shaft, and causes vibrations during the operation and an operation error resulting therefrom. The influence of this torque is great particularly during high-speed rotation of the apparatus, and therefore in order to achieve a high-speed design of the apparatus, it is necessary to suppress this fluctuation torque to a low level as much as possible.

In order to suppress this fluctuation torque, a fluctuation torque cancellation apparatus is proposed, for example, in Japanese Patent Unexamined Publication No. 60-4665. In this apparatus, a follower, to which a cam follower, engaged with a fluctuation torque-cancelling compensation cam mounted on a continuously-rotating shaft (e.g. a cam shaft), is fixedly secured, is reciprocally moved in accordance with a cam curve of the compensation cam, so that a coil spring, provided to urge or press the follower, repeatedly accumulates and releases energy in accordance with a torque fluctuation of the continuously-rotating shaft. More specifically, during a step in which the accumulated energy is released, there is produced a torque acting in a direction to assist the rotation of the continuously-rotating shaft, whereas during a step in which the energy is accumulated, there is produced a torque acting in a direction to prevent the rotation of the continuously-rotating shaft. With this operation, at an acceleration section at which the rotation tends to become low, the acceleration torque is promoted, whereas at a deceleration section at which the rotation tends to become high, the braking torque is promoted, and by doing so, the fluctuation torque can be suppressed to a low level, and the stable motion can be obtained.

However, the above conventional fluctuation torque cancellation apparatus with the mechanical spring, when mounted on the motion conversion apparatus, is usually used, considering the rotational speed (to be used) of a motion conversion apparatus body, and in some cases, the intended effects have not been obtained outside this predetermined rotational speed range. For example, in an apparatus which is designed for high rotational speed, and serves to cancel a fluctuation torque due to an inertia load, a cam curve is so determined that a very large cancellation torque can be produced during acceleration, and when this apparatus is used during low-speed rotation, the produced inertia load is smaller than during the high-speed rotation, and therefore the promoting torque of a level more than necessary is exerted during the acceleration, while the braking torque of a level more than necessary is exerted during deceleration, and in contrast with the intention, an unnecessary torque fluctuation is produced. And besides, when assembling such a fluctuation torque cancellation apparatus, the assembling operation must be effected while holding the coil spring in a considerably-compressed condition, which results in a problem that the efficiency of the operation is poor.

SUMMARY OF THE INVENTION

With the above problems in view, it is an object of this invention to provide a fluctuation torque cancellation apparatus which is connected to a rotation shaft (i.e., an input shaft or an output shaft) of a motion conversion apparatus for converting a continuous rotational motion of the input shaft into a predetermined-type rotational motion of the output shaft, and is capable of positively suppressing a fluctuation torque of the motion conversion apparatus.

Another object of the invention is to provide a fluctuation torque cancellation apparatus which is connected to an input shaft of a pressing machine incorporating a motion conversion apparatus for converting a continuous rotational motion of the input shaft into a reciprocal linear motion of a slide, and is capable of positively suppressing a fluctuation torque.

In a fluctuation torque cancellation apparatus of the present invention, a torque compensation value can be adjusted using both of a spring pressure and an air pressure, and the basic torque compensation is effected using the spring pressure, and when it is desired to adjust the torque compensation value, the air pressure is used. By thus adjusting the air pressure, the torque compensation value can be varied in accordance with the rotational speed, and even when the air is not present in the apparatus, the torque compensation value is basically ensured by the spring pressure, and therefore even if an air leakage should occur, there is no problem. And besides, the spring force can be set to a smaller value as compared with the conventional construction, and therefore the degree of compressing of the spring during the assembling operation is decreased, and advantageously, the efficiency of the operation is enhanced.

According to one aspect of the present invention, there is provided a fluctuation torque cancellation apparatus connectable to a rotation shaft of a motion conversion apparatus for converting a continuous rotational motion of an input shaft into a predetermined-type rotational motion of an output shaft;

wherein the construction is such that, normally, a compensation torque is exerted on the rotation shaft, using only a pressing force by a spring, and when it is desired to vary a torque compensation value, a pressing force by the air is added, thereby applying the compensation torque to the rotation shaft using both of the spring pressure and the air pressure.

One example of the fluctuation torque cancellation apparatus comprises:

a torque compensation cam for applying a compensation torque to a rotation shaft of a motion conversion apparatus;

a cam follower held in rolling engagement with a cam surface of the cam;

a slide member rotatably supporting the cam follower;

a cylinder slidably receiving the slide member;

a spring member mounted in the cylinder for urging the slide member toward the cam to press the cam follower against the cam surface; and means for supplying the air to an air chamber in the cylinder.

The space, receiving the spring member, may be separate from the air chamber, or may be the same as the air chamber. There can be provided means for adjusting the spring force of the spring member, and with this construction the initial spring force of the spring member can be adjusted, and also the range of the compensation torque value between its minimum and maximum values can be widened.

The motion conversion apparatus, to which the fluctuation torque cancellation apparatus is applied, can have a cam transmission mechanism so as to convert the continuous rotational motion of the input shaft into the intermittent rotational motion of the output shaft, and the rotation shaft of the motion conversion apparatus is one of an input shaft, having an indexing cam, and an output shaft fixedly mounted on a turret having cam followers engaged with an indexing cam. As the cam transmission mechanism, any one of a roller gear cam mechanism, a parallel cam mechanism, a barrel cam mechanism and a cylindrical cam mechanism can be used.

In the fluctuation torque cancellation apparatus of the invention, the torque compensation cam may be fixedly mounted on that portion of the rotation shaft received in the motion conversion apparatus, or may be fixedly mounted on that portion of the rotation shaft projecting outwardly from the motion conversion apparatus. In the latter case, the torque compensation cam may be cover with a cam cover, and the torque compensation cam may be fixedly mounted on a rotation shaft mounted in the cam cover, and this rotation shaft may be connected to the rotation shaft of the motion conversion apparatus via power transmission means such as a belt or a coupling.

According to another aspect of the invention, there is provided a fluctuation torque cancellation apparatus connectable to an input shaft of a pressing machine incorporating a motion conversion apparatus for converting a continuous rotational motion of the input shaft into a reciprocal linear motion of a slide;

wherein normally, a compensation torque is exerted on a rotation shaft, using only a pressing force by a spring, and when it is desired to vary a torque compensation value, a pressing force by the air is added, thereby applying the compensation torque to the rotation shaft using both of the spring pressure and the air pressure.

BRIEF DESCRIPTION OF THE DRAWINGS

FIG. 12 is a partly cross-sectional, front-elevational view showing a seventh embodiment of a fluctuation torque cancellation apparatus of the invention, having a cam cover and formed as a unit, and a motion conversion apparatus connected to this torque cancellation apparatus via a coupling;

DESCRIPTION OF THE PREFERRED EMBODIMENTS

First Embodiment

Figure 1A:
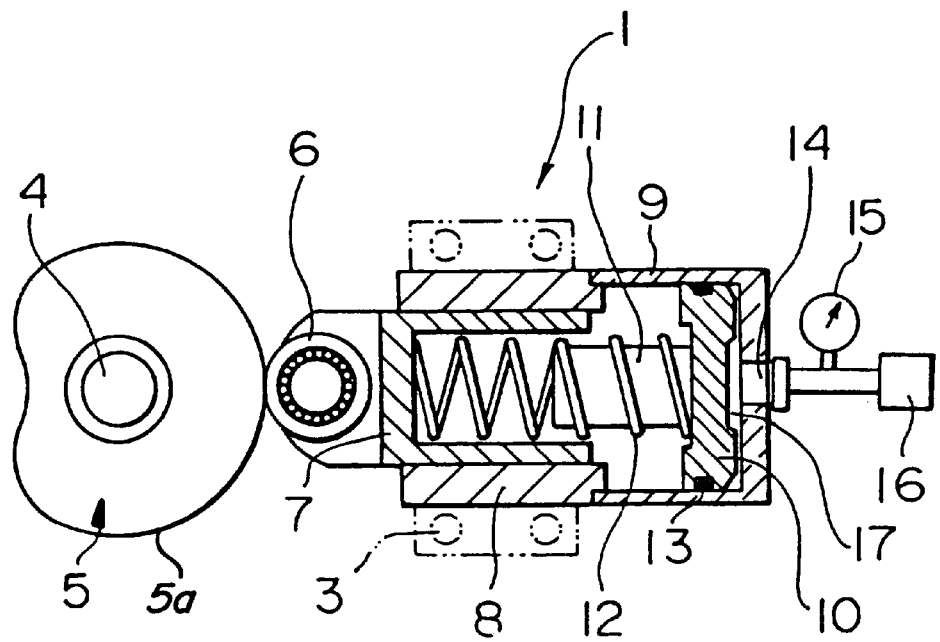
FIG. 1A is a partly cross-sectional, plan view of a fluctuation torque cancellation apparatus of the serial type according to a first embodiment of the invention.
Figure 1B:
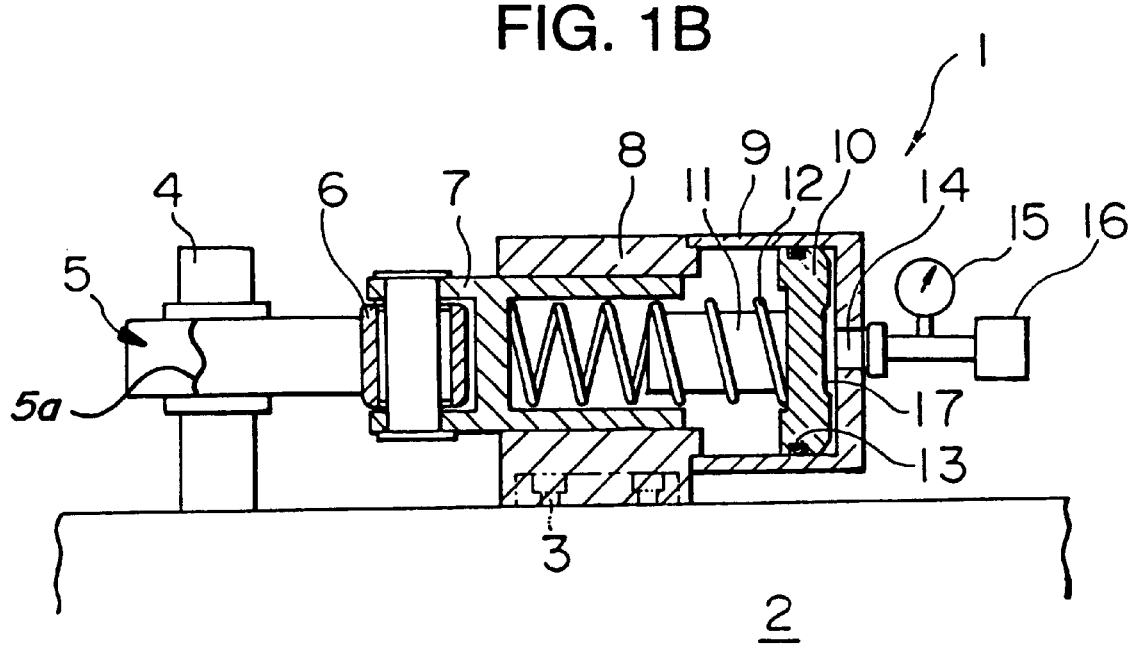
FIG. 1B is a partly cross-sectional, front-elevational view of the apparatus.

A preferred embodiment of the present invention will now be described. FIG. 1 shows the construction of a fluctuation torque cancellation apparatus of the serial type according to a first embodiment of the invention. This fluctuation torque cancellation apparatus 1 is fixedly secured to a motion conversion apparatus 2 by mounting bolts 3. The fluctuation torque cancellation apparatus 1 includes a torque compensation cam 5 fixedly mounted on a rotation shaft 4 serving as an input/output shaft of the motion conversion apparatus 2, and the torque compensation cam 5 is engaged with a cam follower 6. The cam follower 6 is rotatably supported on a distal end portion of a slider 7, and the slider 7 is slidably received in a slide guide 8. The slide guide 8 cooperates with a cylinder 9 to form a casing, and a piston 10 is slidably received in the cylinder 9. A piston rod 11 is formed on and projects from that side or face of the piston 10 facing the slider 7, and a compression coil spring 12 is wound around the piston rod 11, and is provided between a cylindrical portion of the slider 7 and the piston 10. A seal member 13 is mounted on an outer peripheral surface of the piston 10, and forms an air-tight seal between an inner peripheral surface of the cylinder 9 and the outer peripheral surface of the piston 10. An air supply port 14 is formed through an end wall of the cylinder 9, and an air source 16, having a pressure control device 15, is connected to the air supply port 14. The air is supplied from the air source 16 to an air chamber 17 formed between the end surface of the cylinder 9 and the piston 10.

Figure 2A:
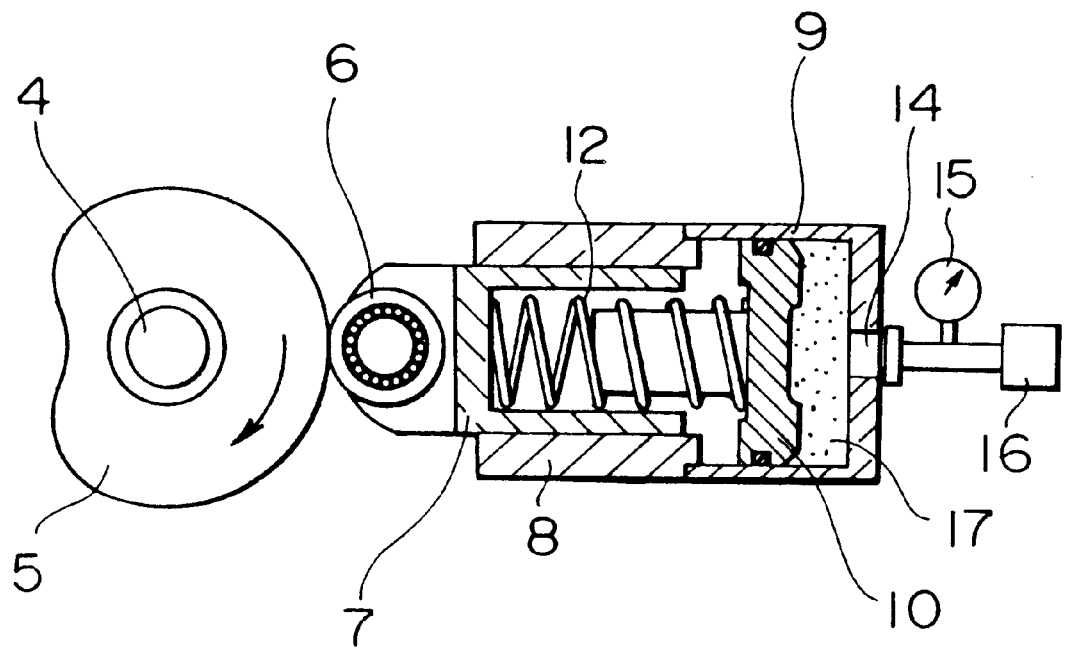
FIG. 2A is a partly cross-sectional, plan view of the apparatus, showing a coil spring in its compressed condition.
Figure 2B:
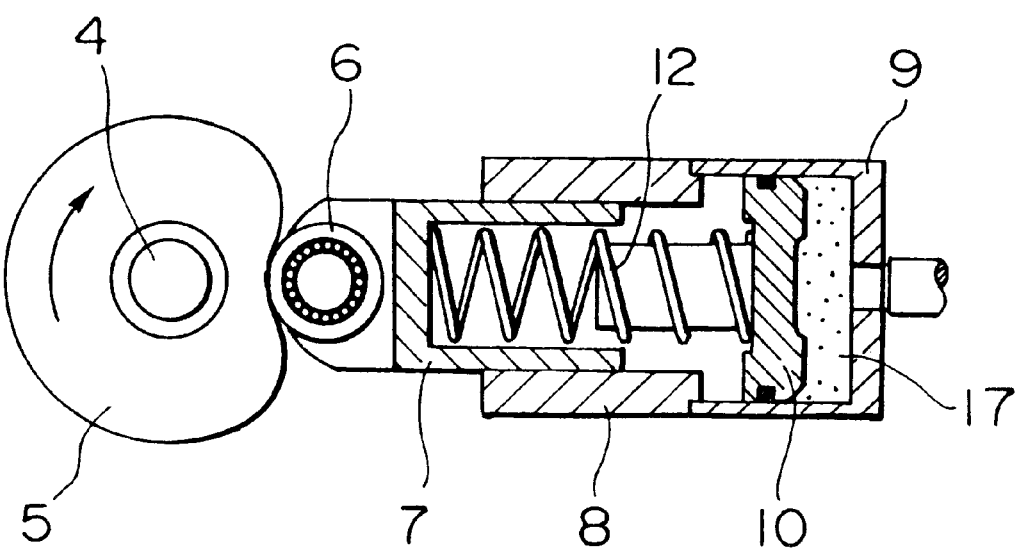
FIG. 2B is a partly cross-sectional, plan view of the apparatus, showing the coil spring in its expanded condition.

The operation of this embodiment will now be described. In the motion conversion apparatus 2 for converting a continuous rotational motion of the input shaft into a predetermined-type motion of the output shaft through a cam transmission mechanism, a torque fluctuation is continuously developing on the input and output shafts of the motion conversion apparatus. In the description given below, the rotation shaft 4 of the motion conversion apparatus 2 serves as the input shaft. When the rotation shaft 4 rotates, the torque compensation cam 5, fixedly mounted on the rotation shaft 4, continuously rotates, and a cam surface 5a, formed on a peripheral surface of the torque compensation cam 5, reciprocally moves the slider 7 while rotating the cam follower 6, as shown in FIG. 2. Therefore, the coil spring 12 is compressed and expanded, so that a pressing force of the cam follower 6 against the torque compensation cam 5 is varied, thereby cancelling a fluctuation torque applied to the rotation shaft 4, thus effecting a torque compensation for the motion conversion apparatus 2. More specifically, when the fluctuation torque, acting on the rotation shaft 4, is large, the coil spring 12 is compressed to increase the compensation torque, and when the fluctuation torque is small, the coil spring 12 is expanded to decrease the compensation torque.

Figure 3:
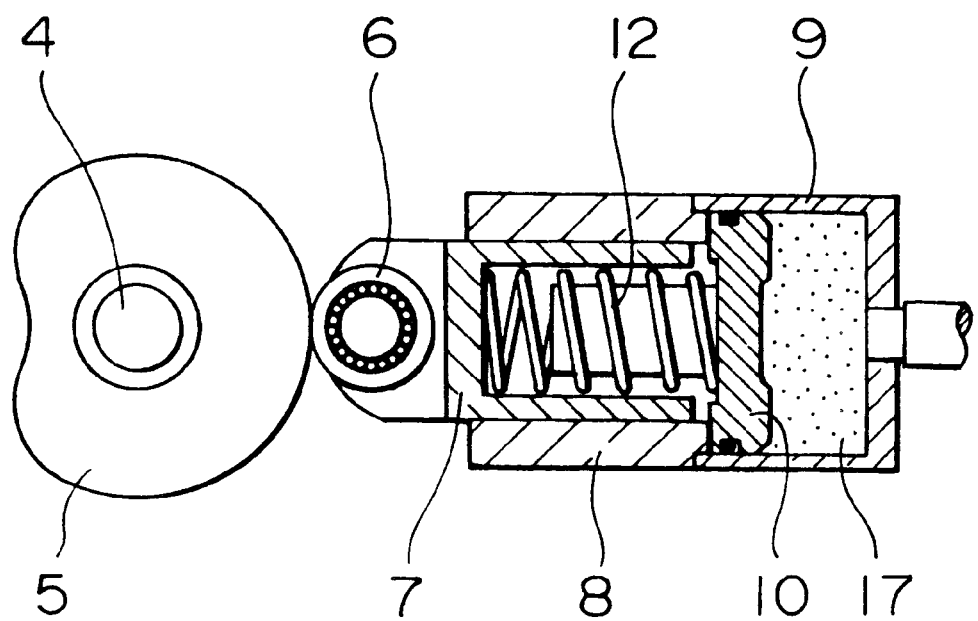
FIG. 3 is a partly cross-sectional, plan view of the apparatus, showing a condition in which the air is fully filled therein.
Figure 4:
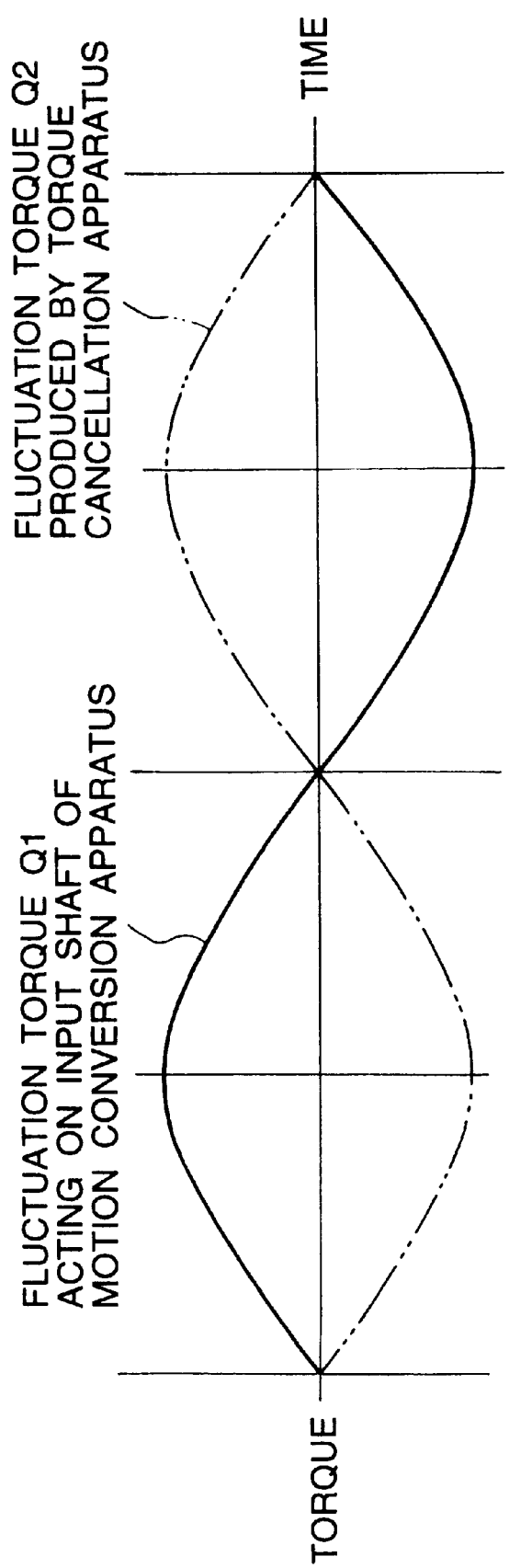
FIG. 4 is a characteristic diagram showing a change of a fluctuation torque when cancelling the fluctuation torque in the apparatus.

When the air is not supplied from the air source 16, the cam follower 6 is pressed against the cam surface 5a of the torque compensation cam 5 only by the pressing force of the coil spring 12, thus producing the compensation torque. The pressing force of the coil spring 12 is so determined that the cam follower 6 will not jump off the torque compensation cam 5 in this condition even at the maximum rotational speed of the motion conversion apparatus 2. Therefore, regardless of whether or not the air is present in the air chamber 17, the apparatus functions properly. In this condition, when the air is supplied to the air chamber 17 from the air source 16, the piston 10 within the cylinder 9 is urged or moved to compress the coil spring 12, so that the pressing force of the cam follower 6 against the cam surface 5a of the torque compensation cam 5 increases, thereby increasing the torque compensation value for the motion conversion apparatus 2. Therefore, by maintaining the air pressure at the optimum position controlled by the pressure control device 15, the compensation torque suitable for the rotational speed in use can be produced. For example, for the motion conversion apparatus 2 which produces a very large fluctuation torque at the time of acceleration, the air pressure within the air chamber 17 is increased to the maximum level as shown in FIG. 3, thereby producing the compensation torque in an optimum manner. The pressure control device 15 can be automatically adjusted in accordance with the rotational speed of the motion conversion apparatus 2 so that the optimum compensation torque can be obtained in accordance with the rotational speed of the motion conversion apparatus 2. With respect to the magnitude of the compensation torque, the constructions of the relevant parts are so determined that the sum of a fluctuation torque Q1, applied to the rotation shaft (input shaft) 4 of the motion conversion apparatus 2, and a fluctuation torque Q2, applied to the rotation shaft 4 when reciprocally the slider 7 through the torque compensation cam 5 of the fluctuation torque cancellation apparatus 1, is always zero.

There may be provided another arrangement in which an abutment portion is provided within the cylinder 9 so that the piston 10 can be stopped at this abutment portion, and with this arrangement there are set two stages, that is, "a weak condition" in which the air is not present in the air chamber, and "a strong condition" in which the maximum amount of air is supplied to abut the piston against the abutment portion, or the operating condition is switched between the ON state and the OFF state. If "this strong condition" is arranged to meet the conditions of the rotational speed to be used, "the weak condition" can be used when the rotational speed is low, and the operating condition is changed to "the strong condition" when the rotational speed becomes high. By doing so, it is possible to overcome the problem of the conventional apparatus that the spring force is very strong in "the strong condition, and rather produces a load at low rotational speed.

Figure 5:
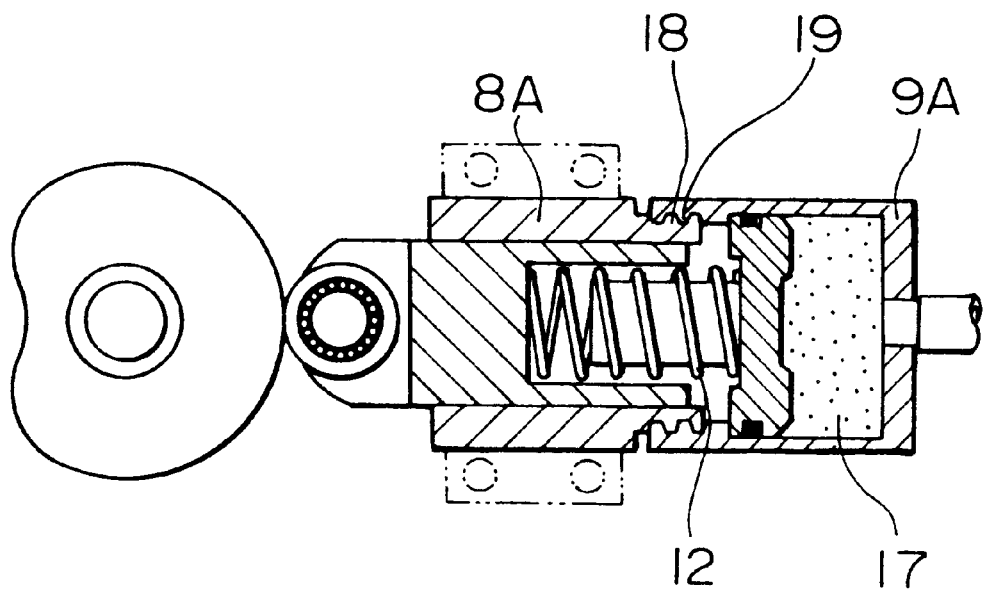
FIG. 5 is a partly cross-sectional, plan view of a modified form of the apparatus provided with spring force-adjusting means.

FIG. 5 shows a modification of the first embodiment, and threaded portions 18 and 19 are provided respectively on a slide guide 8A and a cylinder 9A, and the slide guide 8A and the cylinder 9A are threadedly connected together, thus providing a mechanism for adjusting the spring force of the coil spring 12. By rotating the cylinder 9A, the compression force of the coil spring 12 can be changed, and hence its spring force can be adjusted. Therefore, the initial torque compensation value by the coil spring 12 can be adjusted, and also the minimum torque compensation value, obtained with no air present in the air chamber 17, can be made smaller, and the maximum torque compensation value, obtained with the air fully filled in the air chamber 17, can be made larger.

As described above, in the first embodiment, not only the pressing force by the coil spring 12 is applied, but also the air is supplied to the air chamber 17 if necessary, and thus the compensation torque is produced by the spring pressure and the air pressure, and therefore the fluctuation torque of the motion conversion apparatus can be positively suppressed regardless of the rotational speed. And besides, since the air chamber 17 is separate from the space receiving the coil spring 12, the air-tightness of the air chamber 17 can be relatively easily maintained. Further, by providing the mechanism for adjusting the pressing force of the coil spring 12, the initial value of the compensation torque can be adjusted, and also the range of the compensation torque value between its minimum and maximum values can be widened.

Second Embodiment

Figure 6A:
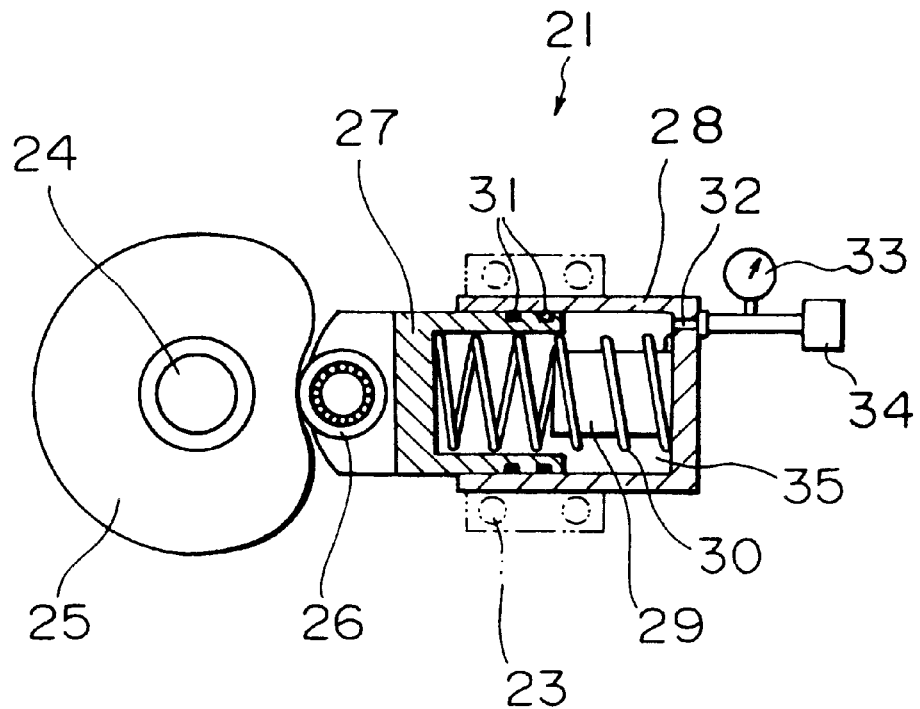
FIG. 6A is a partly cross-sectional, plan view of a fluctuation torque cancellation apparatus of the parallel type according to a second embodiment of the invention.
Figure 6B:
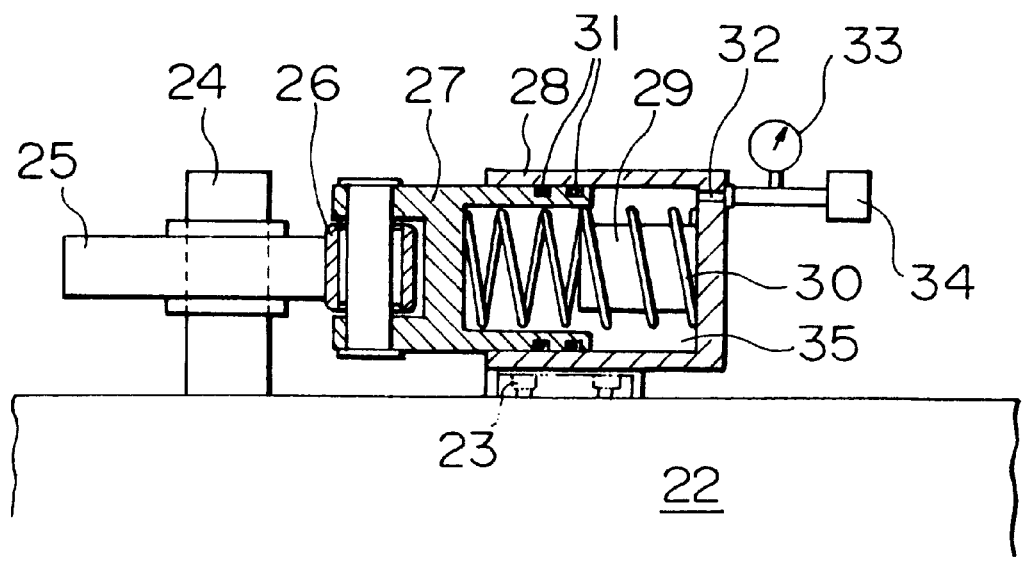
FIG. 6B is a partly cross-sectional, front-elevational view of the apparatus of FIG. 6A.

FIG. 6 shows the construction of a fluctuation torque cancellation apparatus of the parallel type according to a second embodiment of the invention. This fluctuation torque cancellation apparatus 21 is fixedly secured to a motion conversion apparatus 22 by mounting bolts 23. The fluctuation torque cancellation apparatus 21 includes a torque compensation cam 25 fixedly mounted on a rotation shaft 24 serving as an input/output shaft of the motion conversion apparatus 22, and the torque compensation cam 25 is engaged with a cam follower 26. The cam follower 26 is rotatably supported on a distal end portion of a piston 27, and the piston 27 is slidably received in a cylinder 28. A piston rod 29 is formed on and projects from an inner surface of an end wall of the cylinder 28 toward the piston 27, and a compression coil spring 30 is wound around the piston rod 29, and is provided between a cylindrical portion of the piston 27 and the end wall of the cylinder 28. Seal members 31 are mounted on an outer peripheral surface of the piston 27, and form an air-tight seal between an inner peripheral surface of the cylinder 28 and the outer peripheral surface of the piston 27. An air supply port 32 is formed through the end wall of the cylinder 28, and an air source 34, having a pressure control device 33, is connected to the air supply port 32. The air is supplied from the air source 34 to an air chamber 35 defined by the piston 27 and the cylinder 28.

The operation of this embodiment will now be described. The basic operation of this embodiment is similar to that of the first embodiment, and normally, a fluctuation torque of the rotation shaft 24 is absorbed by the compression and expansion of the coil spring 30 effected by the torque compensation cam 25, rotated by the rotation shaft 24 (i.e., the input/output shaft of the motion conversion apparatus 22), and the piston 27 reciprocally moved by the rotating torque compensation cam 25. When the fluctuation torque, applied to the rotation shaft 24, is large, the air is supplied from the air source 34 to the air chamber 35 to increase the air pressure within the air chamber 35 to compress the coil spring 30, and by maintaining the air pressure at the optimum position controlled by the pressure control device 33, the compensation torque suitable for the rotational speed in use can be produced. The pressure control device 33 can be automatically adjusted in accordance with the rotational speed of the motion conversion apparatus 22 so that the optimum compensation torque can be obtained in accordance with the rotational speed of the motion conversion apparatus 22.

Figure 7:
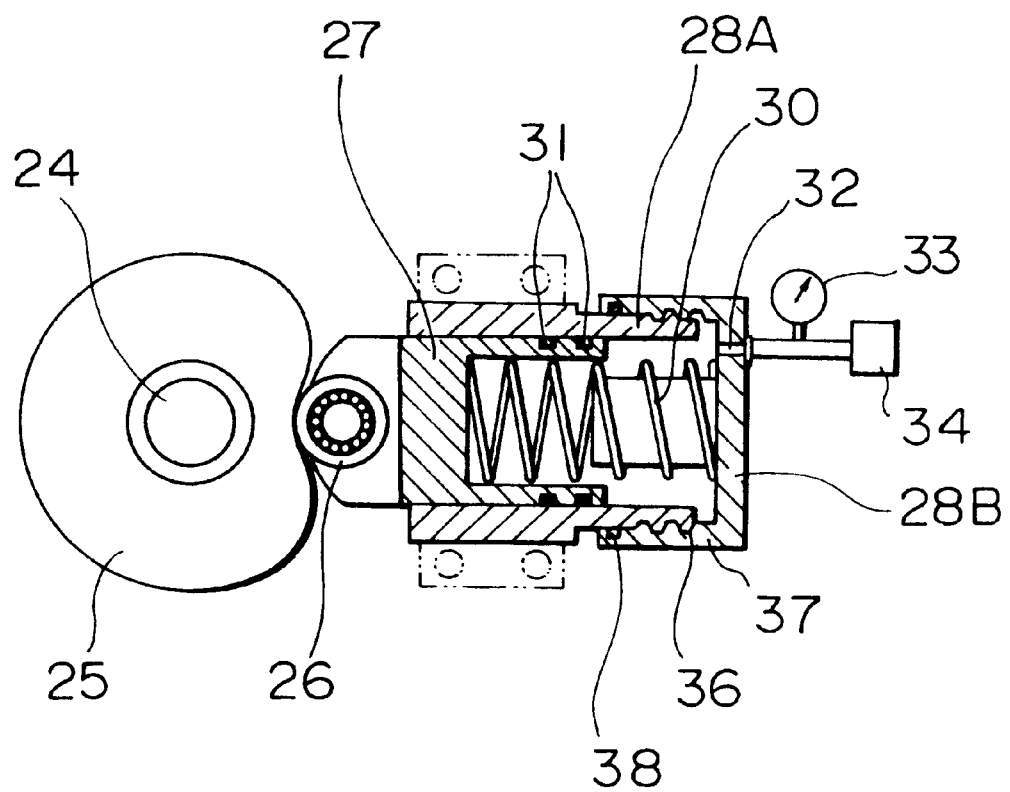
FIG. 7 is a partly cross-sectional, plan view of a modified form of the apparatus of FIG. 6A provided with spring force-adjusting means.

FIG. 7 shows a modification of the second embodiment, and the cylinder 28 is divided into a cylinder 28A of a cylindrical shape and a cap-like cylinder cover 28B, and threaded portions 36 and 37 are provided respectively on the cylinder 28A and the cylinder cover 28B, and the cylinder 28A and the cylinder cover 28B are threadedly connected together, and a seal member 38 is provided between an inner peripheral surface of the cylinder cover 28B and an outer peripheral surface of the cylinder 28A. Thus, there is provided a mechanism for adjusting the spring force of the coil spring 30, and by rotating the cylinder cover 28B, the compression force of the coil spring 30 can be changed so as to adjust the initial spring force of the coil spring 30 and the minimum and maximum compensation torque values.

As described above, in the second embodiment, not only the pressing force by the coil spring 30 is applied, but also the air is supplied to the air chamber 35 if necessary, and thus the compensation torque is produced by the spring pressure and the air pressure, and therefore the fluctuation torque of the motion conversion apparatus can be positively suppressed regardless of the rotational speed. And besides, since the air chamber 35 also serves as the space receiving the coil spring 30, the apparatus can be formed into a compact construction. Further, by providing the mechanism for adjusting the pressing force of the coil spring 30, the initial value of the compensation torque can be adjusted, and also the range of the compensation torque value between its minimum and maximum values can be widened.

Third Embodiment

Figure 8:
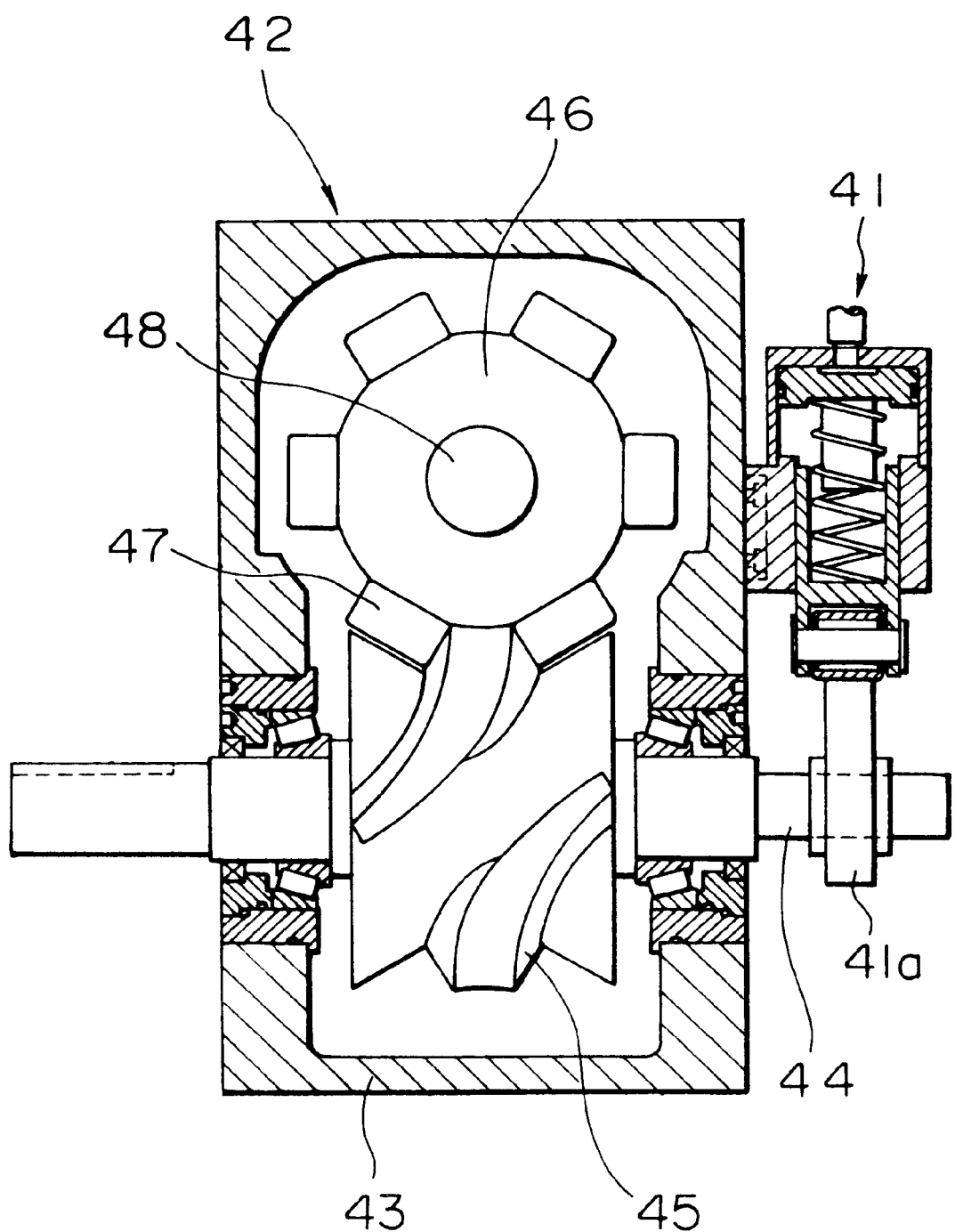
FIG. 8 is a cross-sectional, front-elevational view showing a third embodiment of a fluctuation torque cancellation apparatus of the invention and a motion conversion apparatus having a roller gear cam mechanism.

FIG. 8 show a third embodiment of a fluctuation torque cancellation apparatus of the invention and a motion conversion apparatus. The fluctuation torque cancellation apparatus 41 is of the serial type as shown in FIG. 1, but may be of the parallel type as shown in FIG. 5. The fluctuation torque cancellation apparatus 41 is fixedly secured to a side surface of a housing 43 of the motion conversion apparatus 42, and a torque compensation cam 41a of the apparatus 41 is fixedly mounted on that portion of an input shaft 44 projecting outwardly from the side surface of the housing 43, the input shaft 44 extending through the housing 43. A roller gear cam 45 is fixedly mounted on the input shaft 44 within the housing 43. A plurality of cam followers 47, provided on an outer peripheral surface of a turret 46, are sequentially brought into engagement with the roller gear cam 45, and a continuous rotational motion of the roller gear cam 45 is converted into an intermittent rotational motion of the turret 46, and is outputted from an output shaft 48 provided at a central portion of the turret 46.

In this embodiment, since the roller gear cam mechanism is used as a cam transmission mechanism of the motion conversion apparatus 42, the continuous rotational motion of the input shaft 44 can be positively converted into the intermittent rotational motion of the output shaft 48. And besides, since the torque compensation cam 41a of the fluctuation torque cancellation apparatus 41 is connected directly to the input shaft 44, there are advantages that the construction is simple, and that the maintenance can be easily effected.

Fourth Embodiment

Figure 9:
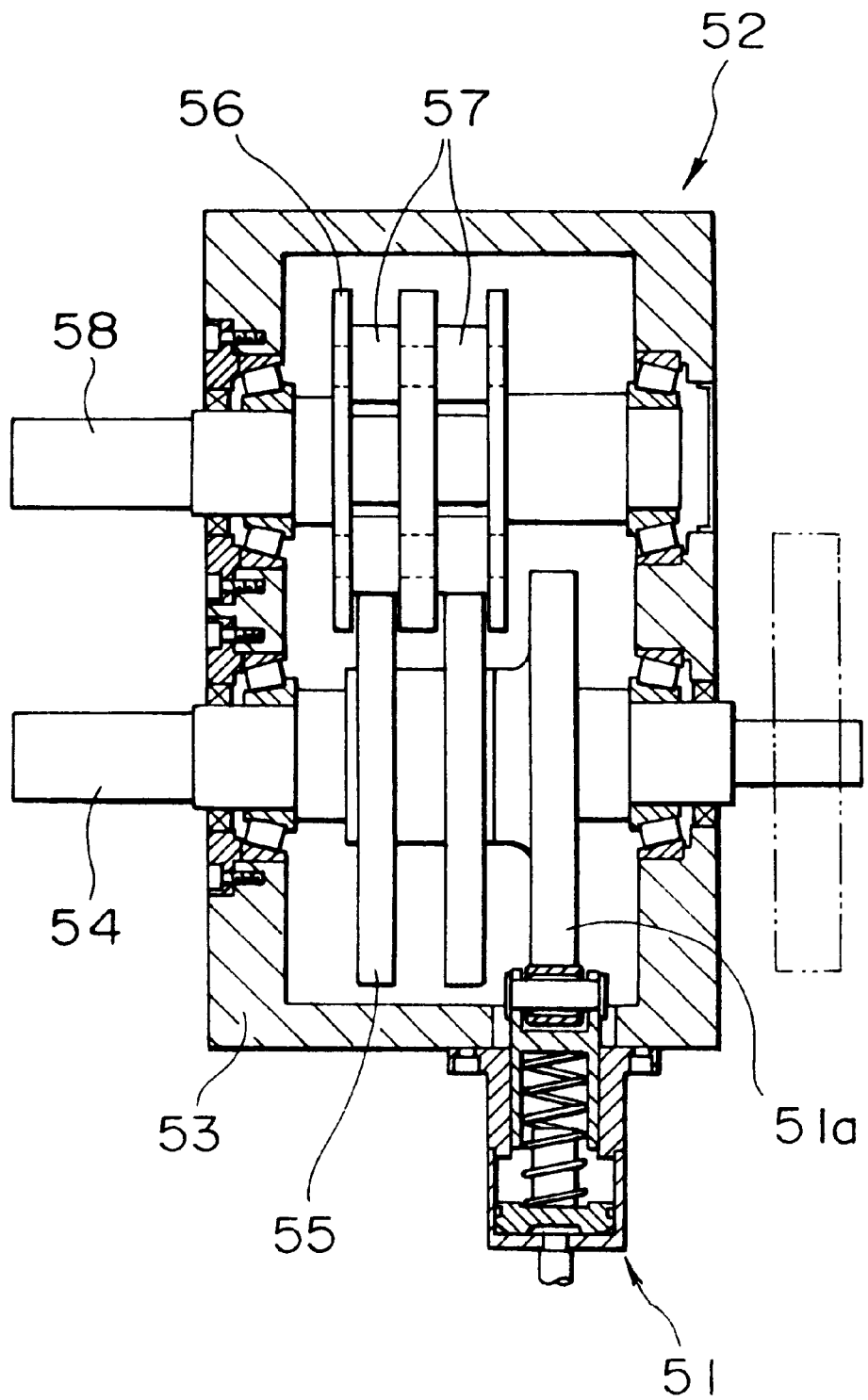
FIG. 9 is a cross-sectional, front-elevational view showing a fourth embodiment of a fluctuation torque cancellation apparatus of the invention and a motion conversion apparatus having a parallel cam mechanism.

FIG. 9 shows a fourth embodiment of a fluctuation torque cancellation apparatus of the invention and a motion conversion apparatus. The fluctuation torque cancellation apparatus 51 is of the serial type as shown in FIG. 1, but may be of the parallel type as shown in FIG. 5. The fluctuation torque cancellation apparatus 51 is fixedly secured to a lower surface of a housing 53 of the motion conversion apparatus 52, and a torque compensation cam 51a of the apparatus 51 is fixedly mounted on that portion of an input shaft 54 disposed within the housing 53, the input shaft 54 extending through the housing 53. A parallel cam 55 is fixedly mounted on the input shaft 54 within the housing 53, and a plurality of cam followers 57, provided on a turret 56, are sequentially brought into engagement with the parallel cam 55, and a continuous rotational motion of the parallel cam 55 is converted into an intermittent rotational motion of the turret 56, and is outputted from an output shaft 58 provided at a central portion of the turret 56.

In this embodiment, since the parallel cam mechanism is used as a cam transmission mechanism of the motion conversion apparatus 52, the continuous rotational motion of the input shaft 54 can be positively converted into the intermittent rotational motion of the output shaft 58. And besides, since the torque compensation cam 51a of the fluctuation torque cancellation apparatus 52 is provided within the motion conversion apparatus 52, the fluctuation torque cancellation apparatus 51 can be formed into a compact construction.

A barrel cam mechanism or a cylindrical cam mechanism may be used as the cam transmission mechanism of the motion conversion apparatus, and in this case, also, the continuous rotational motion of the input shaft can be positively converted into the intermittent rotational motion of the output shaft.

Fifth Embodiment

Figure 10:
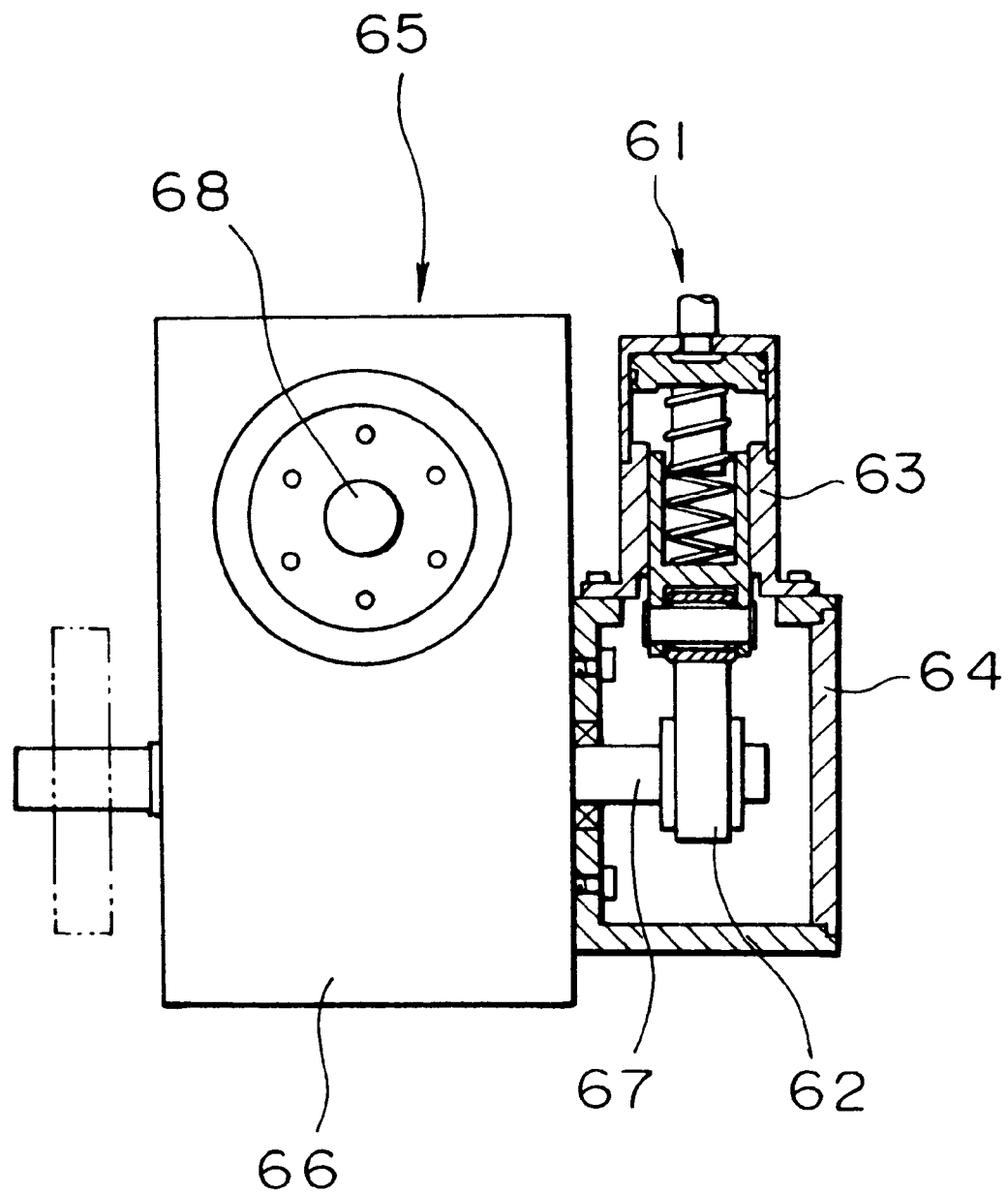
FIG. 10 is a partly cross-sectional, front-elevational view showing a fifth embodiment of a fluctuation torque cancellation apparatus of the invention, having a cam cover, and a motion conversion apparatus.

FIG. 10 shows a fifth embodiment of a fluctuation torque cancellation apparatus of the invention and a motion conversion apparatus. The fluctuation torque cancellation apparatus 61 is of the serial type as shown in FIG. 1, but may be of the parallel type as shown in FIG. 5. In the fluctuation torque cancellation apparatus 61, a torque compensation cam 62 is housed or contained in a cam cover 64 fixedly secured to a slide guide 63, and the cam cover 64 is fixedly secured to a side surface of a housing 66 of the motion conversion apparatus 65. The torque compensation cam 62 is fixedly mounted on that portion of an input shaft 67 projecting outwardly from the housing 66, the input shaft 67 extending through the housing 66. A continuous rotational motion of the input shaft 67 is converted into an intermittent rotational motion of an output shaft 68, and is outputted from this output shaft 68. In this embodiment, since the torque compensation cam 62 is covered with the cam cover 64, dust and the like are prevented from depositing on a cam surface of the cam 62.

Sixth Embodiment

Figure 11:
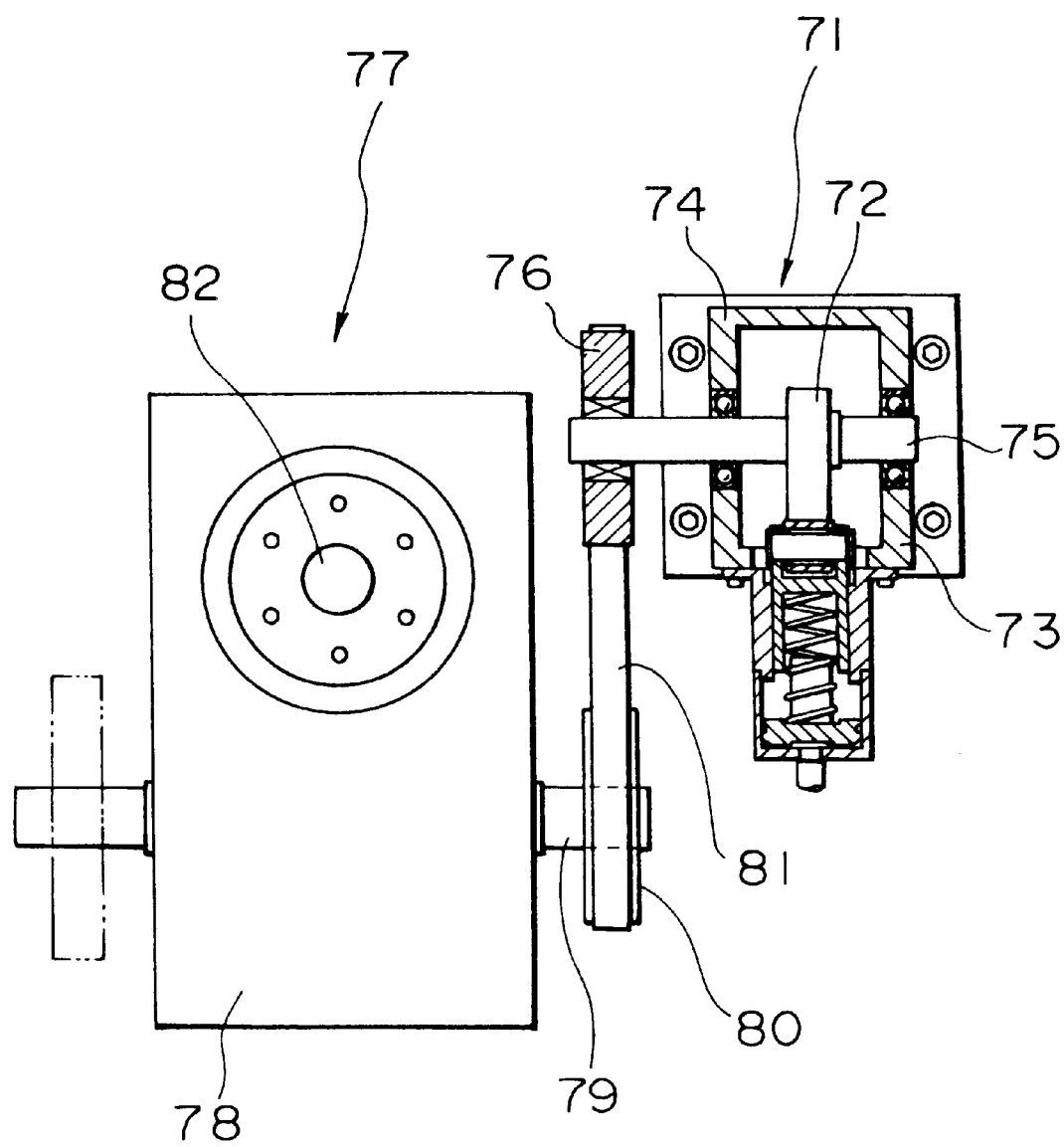
FIG. 11 is a partly cross-sectional, front-elevational view showing a sixth embodiment of a fluctuation torque cancellation apparatus of the invention, having a cam cover and formed as a unit, and a motion conversion apparatus connected to this torque cancellation apparatus via a belt.

FIG. 11 shows a sixth embodiment of a fluctuation torque cancellation apparatus of the invention and a motion conversion apparatus. The fluctuation torque cancellation apparatus 71 is of the serial type as shown in FIG. 1, but may be of the parallel type as shown in FIG. 5. In the fluctuation torque cancellation apparatus 71, a torque compensation cam 72 is housed in a cam cover 74 fixedly secured to a slide guide 73, and is fixedly mounted on a rotation shaft 75 extending through the cam cover 74. A pulley 76 is fixedly mounted on that portion of the rotation shaft 75 projecting outwardly from the cam cover 74. A pulley 80 is fixedly mounted on that portion of an input shaft 79 projecting outwardly from a housing 78 of the motion conversion apparatus 77, and a belt 81 is extended around the two pulleys 76 and 80. A continuous rotational motion of the input shaft 79 is converted into an intermittent rotational motion of an output shaft 82, and is outputted from this output shaft 82. In this embodiment, the fluctuation torque cancellation apparatus 71 can be formed as a unit, and can be installed at a position spaced from the motion conversion apparatus 77.

Seventh Embodiment

FIG. 12 shows a seventh embodiment of a fluctuation torque cancellation apparatus of the invention and a motion conversion apparatus. The fluctuation torque cancellation apparatus 91 is of the same construction as that of the fluctuation torque cancellation apparatus shown in FIG. 11, and a torque compensation cam 92 of the apparatus 91 is housed in a cam cover 94 fixedly secured to a slide guide 93, and is fixedly mounted on a rotation shaft 95 extending through the cam cover 94. One end of the rotation shaft 95, disposed exteriorly of the cam cover 94, is connected by a coupling 99 to one end portion of an input shaft 98 projecting outwardly from a housing 97 of the motion conversion apparatus 96. A continuous rotational motion of the input shaft 98 is converted into an intermittent rotational motion of an output shaft 100, and is outputted from this output shaft 100. In this embodiment, the fluctuation torque cancellation apparatus 91 can be formed as a unit, and can be installed at a position spaced from the motion conversion apparatus 96.

Figure 13A:
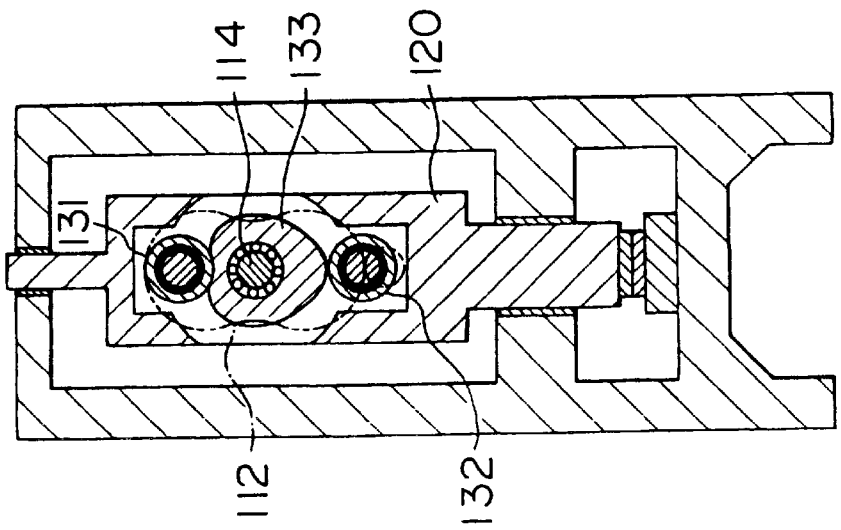
FIG. 13A is a schematic cross-sectional, front-elevational view of a pressing machine incorporating a motion conversion apparatus having an eight embodiment of a fluctuation torque cancellation apparatus of the invention.
Figure 13B:
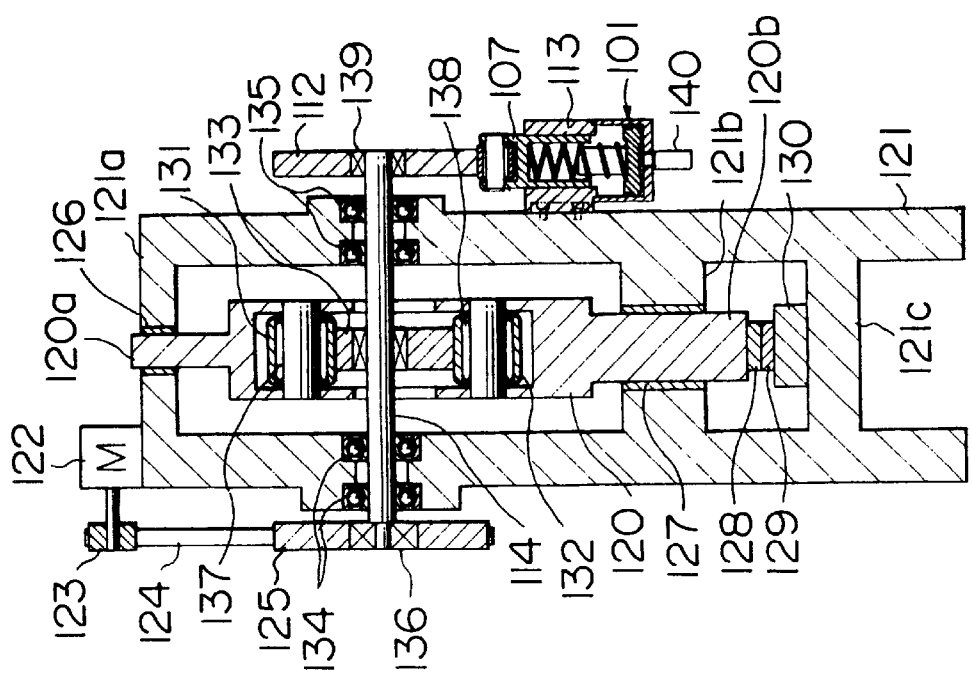
FIG. 13B is a schematic cross-sectional, side-elevational view of the pressing machine of FIG. 13A as viewed from the left side.

FIG. 13 shows a pressing machine incorporating a motion conversion apparatus having an eighth embodiment of a fluctuation torque cancellation apparatus of the invention. A frame 121 of this pressing machine has a box-shape, and includes an upper support portion 121a, an intermediate support portion 121b and a lower support portion 121c. An upper guide portion 120a of a slide 120 slidably extends through the upper support portion 121a of the frame 121 through a bearing 126 for vertical (upward and downward) movement, and a lower guide portion 120b of the slide 120 slidably extends through the intermediate support portion 121b of the frame 121 through a bearing 127 for vertical movement. An upper die 128 is mounted on a lower end of the slide 120, and a lower die 129 is mounted on the lower support portion 121c of the frame 121 through a bolster 130.

A pair of upper and lower cam followers 131 and 132 are rotatably mounted on an intermediate portion of the slide 120 through respective needles 137 and 138. An input shaft 114 extends horizontally through the intermediate portion of the slide 120 between the pair of cam followers 131 and 132. A heart-shaped drive plate cam 133 is fixedly mounted on the input shaft 114, and is interposed between and held in contact with the pair of cam followers 131 and 132. The input shaft 114 is rotatably supported at its opposite end portions on the frame 121 through bearings 134 and 135. A flywheel 125 is fixedly mounted on one end of the input shaft 114 through a shaft-fastening element 136, and this flywheel 125 is rotated through a belt 124 and a pulley 123 fixedly mounted on a rotation shaft of a motor 122 mounted on the upper support portion 121a of the frame 121. A torque compensation cam 112 of the fluctuation torque cancellation apparatus 101 is fixedly mounted on the other end of the input shaft 114 through a fastening element 139.

The above pressing machine operates as follows. When the motor 122 is rotated, its rotational force is transmitted via the pulley 123 and the belt 124 to the flywheel 125 to rotate the input shaft 114, so that the slide 120 reciprocally moves linearly upward and downward through the drive plate cam 133 and the pair of cam followers 131 and 132, and a workpiece is worked or processed between the upper die 128, mounted on the slide 120, and the lower die 130 mounted on the lower support portion 121c of the frame 121. On the other hand, while the slide 120 reciprocally moves to work the workpiece, the fluctuation torque cancellation apparatus 101 operates to cancel a load fluctuation torque exerted on the input shaft 114.

As is clear from the foregoing, the fluctuation torque cancellation apparatus of this eighth embodiment is connected to the input shaft 114 of the pressing machine incorporating the motion conversion apparatus for converting the continuous rotational motion of the input shaft 114 into the linear reciprocal motion of the slide 120. The fluctuation torque cancellation apparatus 101 of this eighth embodiment itself is similar in construction to the fluctuation torque cancellation apparatus of FIG. 1 except that the torque compensation cam 112 is so shaped as to cancel the fluctuation torque acting on the input shaft 114 during the time when the slide 120 reciprocally moves to work the workpiece. The fluctuation torque cancellation apparatus 101 includes a slider 107, a slide guide 113, an air supply port 140 and so on.

Although the fluctuation torque cancellation apparatus shown in FIG. 13 is similar to that of FIG. 1, it can, of course, be replaced by any one of the fluctuation torque cancellation apparatuses shown respectively in FIGS. 5, 6, 7, 10 and 12. The pressing machine of the type as shown in FIG. 13 is disclosed in Japanese Patent Unexamined Publication No. 7-116897 which corresponds to U.S. Pat. No. 5,544,567 issued Aug. 13, 1996.

As described above, in the present invention, by using both of the spring pressure and the air pressure, the torque compensation value can be adjusted, and the basic torque compensation is effected by the spring pressure, and when adjusting the torque compensation value, the air pressure is used, so that the torque compensation value can be varied in accordance with the rotational speed. Even when the air is not present in the air chamber, the torque compensation value is basically ensured by the spring pressure, and therefore even if an air leakage should occur, there is no problem. And besides, the spring pressure can be made smaller as compared with the conventional construction, and therefore the degree of compressing of the spring during the assembling operation is decreased, and the efficiency of the assembling operation can be enhanced.

What is claimed is:

1. A fluctuation torque cancellation apparatus for cancelling a fluctuation torque acting on a rotation shaft of a motion conversion apparatus comprising:

a torque compensation cam adapted to be connected to said rotation shaft for rotation therewith;

a cam follower held in rolling engagement with a cam surface of said cam;

a slide member rotatably supporting said cam follower;

a cylinder slidably receiving said slide member and having an air chamber defined therein;

a mechanical spring member mounted in said cylinder for resiliently urging said slide member toward said cam thereby pressing said cam follower against said cam surface; and air supplying means selectively adjustable for supplying an adjusted amount of pressurized air into said air chamber in said cylinder, said air chamber adapted to receive and confine therein the air supplied from said air supplying means for urging said slide member and hence urging said cam follower into engagement with said cam surface in response to the pressure of the supplied air.

2. Apparatus according to claim 1, in which a space in said cylinder which receives said spring member is separated from said air chamber by a piston slidably mounted in said cylinder, and said spring member is provided between said slide member and said piston so as to be expanded and contracted therebetween.

3. Apparatus according to claim 2 in which said motion conversion apparatus includes a cam transmission mechanism, and the rotation shaft of said motion conversion apparatus is one of an input shaft, having an indexing cam, and an output shaft fixedly mounted on a turret having cam followers engaged with an indexing cam.

4. Apparatus according to claim 2 in which said torque compensation cam is fixedly mounted on that portion of the rotation shaft received in said motion conversion apparatus.

5. Apparatus according to claim 2 in which said torque compensation cam is fixedly mounted on a portion of the rotation shaft projecting outwardly from said motion conversion apparatus.

6. Apparatus according to claim 2 in which there is provided threadably engageable means for threadably adjusting the spring force of said spring member.

7. Apparatus according to claim 1, in which said air chamber in said cylinder also serves as a space receiving said spring member.

8. Apparatus according to claim 7 in which there is provided means for adjusting the spring force of said spring member.

9. Apparatus according to claim 7 in which said torque compensation cam is fixedly mounted on that portion of the rotation shaft received in said motion conversion apparatus.

10. Apparatus according to claim 1 in which said motion conversion apparatus includes a cam transmission mechanism, and the rotation shaft of said motion conversion apparatus is one of an input shaft, having an indexing cam, and an output shaft fixedly mounted on a turret having cam followers engaged with an indexing cam.

11. Apparatus according to claim 10, in which said cam transmission mechanism is a roller gear cam mechanism.

12. Apparatus according to claim 10, in which said cam transmission mechanism is a parallel cam mechanism.

13. Apparatus according to claim 10, in which said cam transmission mechanism is a barrel cam mechanism.

14. Apparatus according to claim 1 in which said torque compensation cam is fixedly mounted on that portion of the rotation shaft received in said motion conversion apparatus.

15. Apparatus according to claim 1 in which said torque compensation cam is fixedly mounted on a portion of the rotation shaft projecting outwardly from said motion conversion apparatus.

16. Apparatus according to claim 15, in which said torque compensation cam is covered with a cam cover.

17. Apparatus according to claim 16, in which said torque compensation cam is fixedly mounted on a rotation shaft mounted in said cam cover, and said rotation shaft is connected to the rotation shaft of said motion conversion apparatus via power transmission means.

18. The apparatus of claim 1 wherein said rotation shaft is an input shaft of said motion conversion apparatus.

19. The apparatus of claim 1 wherein said rotation shaft is an output shaft of said motion conversion apparatus.

20. A fluctuation torque cancellation apparatus for cancelling a fluctuation torque acting on a rotation shaft of a motion conversion apparatus comprising:

a torque compensation cam adapted to be connected to said rotation shaft for rotation therewith;

a cam follower held in rolling engagement with a cam surface of said cam;

a slide member rotatably supporting said cam follower;

a cylinder slidably receiving said slide member, a mechanical spring member mounted in said cylinder for resiliently urging said slide member toward said cam thereby pressing said cam follower against said cam surface; and spring bias means operatively connected to said spring member and selectively adjustable for applying a selectively variable bias on said spring member for varying the force urging said slide member and hence urging said cam follower into engagement with said cam surface by the force of said spring member including the variable bias applied by said spring bias means.

21. Apparatus according to claim 20 with said spring bias means comprising a source of selectively adjustable air pressure.

* * * * *